US012596170B2

(12) United States Patent (10) Patent No.: US 12,596,170 B2
Zamora Cadenas et al. (45) Date of Patent: Apr. 7, 2026

(54) REAL-TIME LOCATING SYSTEM

(71) Applicant: ASOCIACION CENTRO TECNOLOGICO CEIT, San Sebastián (ES)

(72) Inventors: Leticia Zamora Cadenas, San Sebastián (ES); Igone Velez Isasmendi, San Sebastián (ES); Marcos Losada Gobantes, San Sebastián (ES); Paul Bustamante Merino, San Sebastián (ES)

(73) Assignee: ASOCIACION CENTRO TECNOLOGICO CEIT, San Sebastián (ES)

( * ) Notice: Subject to any disclaimer, the term of this patent is extended or adjusted under 35 U.S.C. 154(b) by 338 days.

(21) Appl. No.: 18/261,545

(22) PCT Filed: Jan. 18, 2021

(86) PCT No.: PCT/ES2021/070021
§ 371 (c)(1),
(2) Date: Jul. 14, 2023

(87) PCT Pub. No.: WO2022/152953
PCT Pub. Date: Jul. 21, 2022

(65) Prior Publication Data
US 2024/0085516 A1 Mar. 14, 2024

(51) Int. Cl.
*G01S 5/02* (2010.01)
(52) U.S. Cl.
CPC ........ *G01S 5/0289* (2013.01); *G01S 5/02216* (2020.05)

(58) Field of Classification Search
CPC .......................... G01S 5/0289; G01S 5/02216
(Continued)

(56) References Cited

U.S. PATENT DOCUMENTS 10,231,078 B1 3/2019 Swart
2014/0375429 A1* 12/2014 Cristache .............. G01S 13/876
340/10.1
(Continued)

FOREIGN PATENT DOCUMENTS

CA 2951154 C * 8/2019 .......... G01S 5/0226
WO 2018057629 A1 3/2018
(Continued)

OTHER PUBLICATIONS

International Search Report for Corresponding International Application No. PCT/ES2021/070021, 2 pages, Oct. 1, 2021.

*Primary Examiner* — Harry K Liu
(74) *Attorney, Agent, or Firm* — LUCAS & MERCANTI, LLP

(57) ABSTRACT
A real-time locating system having: at least one radio frequency tag (2) in a mobile element located in real time and at least one locating station (4) having: a processing and control unit (7); a plurality of transceivers (6); a plurality of antennas (5); means for determining a relative position of the antennas (5) and/or of the transceivers (6); and a synchronisation unit (8) configured to send one same clock signal to all the transceivers (6); the tag (2) is configured to periodically emit a presence signal associated with an identifier; the processing and control unit (7) calculates the position of the tag (2) reaches one or more transceivers (6), the values from the sensors (9) of the locating station (4) and/or the values from the sensors (9) of the tag (2) to estimate the current position of the tag (2).

13 Claims, 3 Drawing Sheets

(58) Field of Classification Search
USPC ......................................................... 342/463
See application file for complete search history.

(56) References Cited

U.S. PATENT DOCUMENTS

| | | | | |
|---|---|---|---|---|
| 2016/0029160 A1* | 1/2016 | Theurer | .................. | G16Z 99/00 |
| | | | | 455/456.1 |
| 2017/0123039 A1 | 5/2017 | Shin et al. | | |
| 2022/0014875 A1* | 1/2022 | Rybalko | ............... | H04W 4/029 |

FOREIGN PATENT DOCUMENTS

| | | | | | |
|---|---|---|---|---|---|
| WO | 2018089408 A1 | 5/2018 | | | |
| WO | WO-2025122399 A1 * | 6/2025 | ............... | G01S 5/14 |

* cited by examiner

REAL-TIME LOCATING SYSTEM

CROSS REFERENCE TO RELATED APPLICATION

This Application is a 371 of PCT/ES2021/070021, filed on Jan. 18, 2021, each of which are incorporated herein by reference.

TECHNICAL FIELD

The object of the present invention is a real-time locating system that allows mobile elements within a certain enclosure to be located, without the need to install beacons at fixed points in the infrastructure of said enclosure.

Likewise, through the real-time locating system object of the present invention, it is also possible to control the location of mobile elements found in outdoor spaces, without the need to have an infrastructure of fixed beacons distributed and previously calibrated in the space where they have been installed.

The real-time locating system object of the present invention is applicable in the industry of indoor or outdoor locating systems.

STATE OF THE ART

Currently, to locate an object in real time inside an enclosure where a geolocation satellite signal is not received with sufficient quality, radio frequency positioning systems (real-time locating systems or "RTLS") are used based on the sending of radio frequency signals, such as Wi-Fi, Bluetooth, ultra-wide band (UWB), etc. Due to its high bandwidth, UWB is considered the technology with the greatest potential for use in a positioning system of this type. These indoor positioning systems involve placing "radio frequency tags" on the objects to be located, as well as placing radio frequency sensors (anchors) at various fixed points in the enclosure where the objects to be located are distributed or moved.

The systems described above have two drawbacks, namely: the need to install and calibrate the anchors at various fixed points throughout an enclosure (where the enclosure may be of considerable dimensions) and the high use of the wireless network (whether UWB or other signals) when multiple anchors are simultaneously emitting signals to multiple tags and the latter are in turn emitting response signals to multiple anchors. Both the time of arrival (ToA) of the signal and the time difference of arrival (TDoA) between the emission and reception of a tag signal received by two or more anchors can be used to calculate the position of the object that carries the tag within the enclosure. The high use of the network can cause distortions, delays due to high latency and, ultimately, inaccuracy in the location of objects inside the enclosure.

OBJECT OF THE INVENTION

In order to solve the aforementioned drawbacks, the present invention relates to a real-time locating system.

The real-time locating system object of the present invention comprises at least one radio frequency tag disposed in a mobile element to be located in real time (e.g., a drone, a mobile warehouse cart, a vehicle, etc.).

In a novel way, the real-time locating system object of the present invention comprises at least one locating station (which can be static or also be disposed in a mobile element).

The at least one locating station comprises:
a processing and control unit;
a plurality of transceivers connected to the processing and control unit and configured to remain in a listening or receiving state by default;
a plurality of antennas connected to the transceivers;
means for determining a relative position of the antennas with respect to one another, and/or between transceivers, and;
a synchronisation unit configured to send one same clock signal to all the transceivers of the at least one locating station.

For its part, the at least one tag comprises:
a transceiver;
an antenna connected to the transceiver, and;
a control unit.

The at least one tag is configured to periodically emit a presence signal associated with an identifier of said at least one tag.

The at least one locating station is configured so that, through at least one first antenna associated with a first transceiver and through at least one second antenna that can be associated with the first transceiver or with a second transceiver, the first transceiver and, if applicable, also the second transceiver receive said presence signal associated with the identifier of the at least one tag and send to the processing and control unit the identifier of the tag, as well as a reception time, marked by the clock signal, of the presence signal in the at least one first antenna and in the at least one second antenna. Other types of information associated with the at least one tag may also be sent, information such as values from the sensors.

The processing and control unit is configured to calculate the position of the at least one tag based on the difference in the reception time of the presence signal of the at least one tag between the at least one first antenna and the at least one second antenna.

Due to the real-time locating system described above, it is possible to locate each mobile tag without the need to install a set of fixed beacons or anchors at fixed points throughout an enclosure.

Likewise, since the radio frequency tags themselves are the ones that send their presence signal associated with their own identifier to the locating station, it is not necessary to establish two-way communication between each tag and each transceiver. Therefore, the wireless channels (whether UWB or another type of signal) used in communications can be kept free at almost all times, reducing latency in said communications and the risk of errors in sending the signals.

According to a possible embodiment, the locating station comprises a plurality of sensors. These sensors of the locating station can be configured to help calculate the position of the at least one tag or the relative position of some transceivers with respect to others or of some antennas with respect to others.

Likewise, according to a possible embodiment, the at least one tag also comprises a plurality of sensors. These sensors of the at least one tag can be configured to help calculate the position of the at least one tag.

According to a possible embodiment, the set of sensors of the locating station and/or of the sensors of the at least one tag comprises a selection of one or more of the following elements: an accelerometer, a gyroscope, a pressure sensor, a magnetometer and a temperature sensor.

According to a possible embodiment, the means for determining a relative position of the antennas of the locating station with respect to one another comprise the sensors of the locating station and/or the sensors of the at least one tag.

Preferably, the locating station comprises at least four antennas. Also preferably, the locating station comprises at least four transceivers. If there are fewer transceivers than antennas, several antennas will be connected to one same transceiver.

This makes it possible to improve the estimate made by the processing and control unit about the location of each mobile tag, since the probabilities of the presence signal of the tag being received by a greater number of transceivers and/or antennas increase and, therefore, there will be different values for the times of arrival of the signal for each transceiver and/or antenna, thereby improving the estimate of the location of the tag.

According to a preferred embodiment, the synchronisation unit comprises a clock, first buffers, second buffers, a NAND gate, a D-type flip-flop and a third buffer, wherein the synchronisation unit has as an input a first digital signal that is generated by the processing and control unit to synchronise the transceivers, wherein the synchronisation unit is configured to generate as output signals a second digital signal configured to synchronise the transceivers, and a third digital signal as a clock signal.

According to a possible embodiment, the processing and control unit is configured to establish the moment that the presence signal of a tag reaches a certain transceiver as a time source reference and, based on said time source, determine the difference in the time of arrival of the presence signal of said tag to each additional transceiver that receives the presence signal of said tag. The transceiver used as time source reference does not always have to be the same; it can be a different transceiver each time a presence signal of the tag is received, meaning that having a master transceiver is not required.

The processing and control unit can choose the transceiver it considers as a reference each time depending on the previously estimated position of the at least one tag, the values from the sensors of the locating station, the values from the sensors of the tag, and/or the values for the arrival times of the presence signal of said tag to each transceiver of the locating station.

The processing and control unit uses the information about the moment that the presence signal of the at least one tag reaches one or more transceivers, the values from the sensors of the locating station, the values from the sensors of said tag and/or the values from the previously estimated position of the tag to estimate the current position of the tag.

According to a possible embodiment, the means for determining a relative position of the antennas of the locating station with respect to one another comprise a configuration of the transceivers, which are configured to communicate wirelessly with one another, and wherein the processing and control unit is configured to estimate the relative position of some antennas with respect to others based on the moment that the signal sent by at least one transceiver reaches at least another transceiver.

According to a possible embodiment, the means for determining a relative position of the antennas of the locating station with respect to one another comprise a configuration of the processing and control unit, which is configured to determine the moment that the presence signal of the at least one tag reaches one or more transceivers.

According to a possible embodiment, the means for determining a relative position of the antennas of the locating station with respect to one another comprise a configuration of the processing and control unit, which is configured to determine previously estimated position values of the at least one tag.

This previous estimate of the position of the tag can be based on an estimate of the range (angle, received power or time of flight) of the signal received from the at least one tag.

According to a possible embodiment, the locating station is configured to send, through one or more transceivers, a signal to the at least one tag, for guiding or restricting the movement of the mobile element that carries said at least one tag.

This allows vehicles that carry said tag to be guided, or warning signals to be sent about dangerous and/or restricted areas in which the mobile element or vehicle must not circulate.

According to a possible embodiment, the locating station is configured to use the position information of the at least one tag, for guiding or restricting the movement of a mobile element on which the locating station is mounted.

Also according to a possible embodiment, the locating station is configured to use measurements from the sensors of the at least one tag and/or measurements from the sensors of the locating station, for guiding or restricting the movement of a mobile element on which said locating station is mounted.

In this way, the locating station is configured to estimate the relative positioning of a mobile element that carries one or more tags and the locating station, wherein the locating station is carried by a vehicle or mobile robot. This relative positioning can serve as a safety system for said vehicle or mobile robot, which will try to avoid colliding with the tag-carrying mobile elements in its trajectory.

DESCRIPTION OF THE FIGURES

The following figures have been included as part of the explanation of at least one embodiment of the invention.

DETAILED DESCRIPTION OF THE INVENTION

Figure 1:
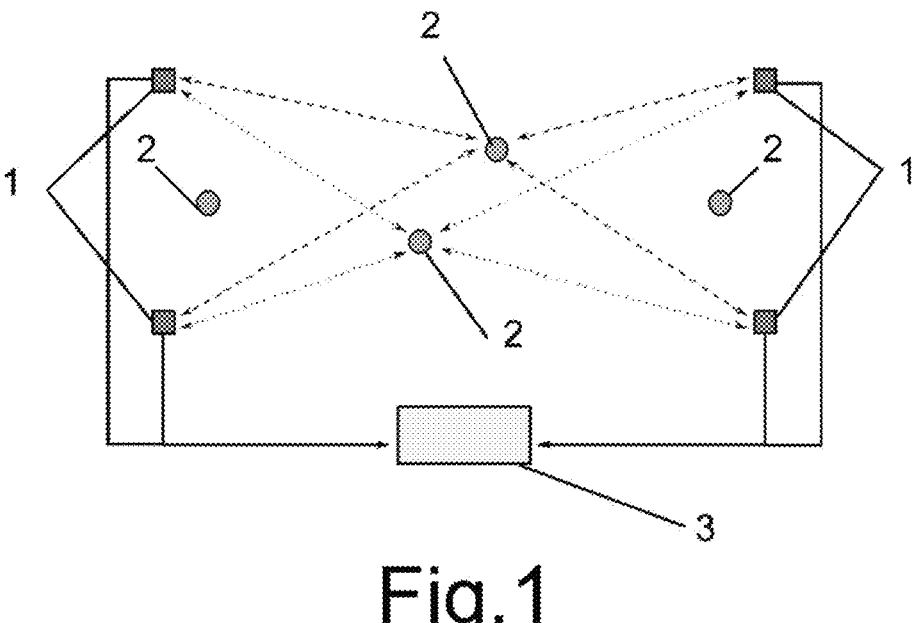
FIG. 1 shows a basic diagram of a real-time locating system according to the state of the art.

As previously mentioned, the present invention relates to a real-time locating system.

As previously mentioned, in the state of the art, the real-time locating systems for indoor spaces comprise a plurality of anchors (1) placed at various points throughout an enclosure. These anchors (1) simultaneously emit location signals directed in all directions, such that the signals emitted by the anchors (1) reach the tags (2) disposed in the different objects to be located (for example, mobile cars, handcart robots, etc.). The tags (2) emit, in response to the signal received from each anchor (1), a response signal that reaches each anchor (1) in a set time. The anchors (1) are connected to a central unit (3), which processes the response signals from each tag (2) and received by each anchor (1) at a set moment of time. Through the corresponding location algorithm, the central unit (3) associates certain positioning or location coordinates within the enclosure with each tag (2).

FIG. 1 schematically shows a conventional real-time locating system, as described in the previous paragraph, wherein four anchors (1) and four tags (2) are shown. The location of each tag (2) is estimated in two steps: estimate of the range (angle, received power or time of flight) between each anchor (1) and the tags (2), which is calculated using rank algorithms. These range estimates are not usually equal to their true value, since errors in transmission or multipath can deteriorate the signals. Second, the position of each tag (2) is estimated in the central unit (3) using the range estimates, using a positioning algorithm.

Figure 2:
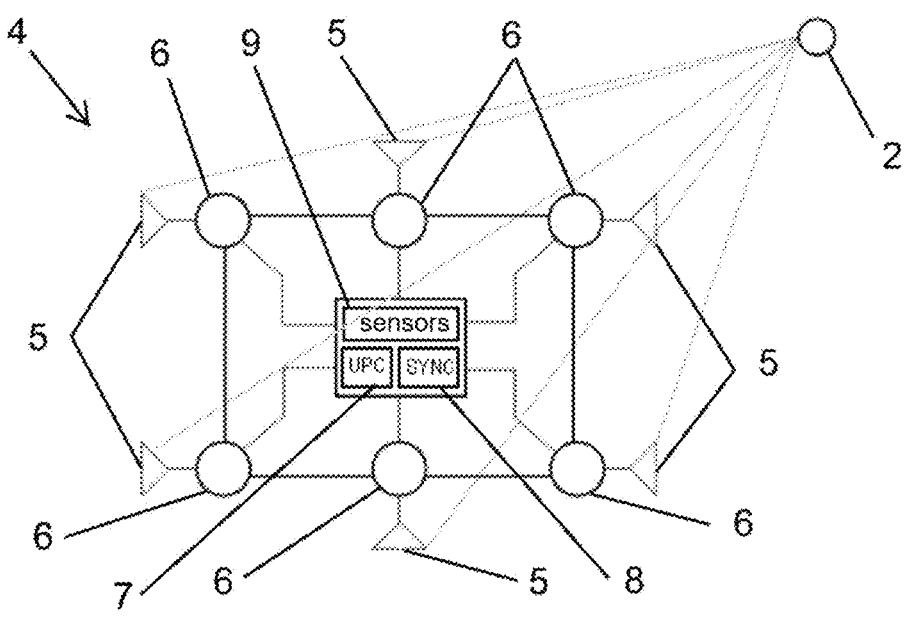
FIG. 2 shows a schematic view of an exemplary embodiment of the real-time locating system object of the present invention.

FIG. 2 shows a diagram of an embodiment of the real-time locating system object of the present invention.

The system comprises a locating station (4) and one or more tags (2) found on the objects to be located, either inside a closed enclosure or in an open space.

The locating station (4) comprises a plurality of antennas (5) and a plurality of transceivers (6), wherein the number of antennas (5) is not necessarily equal to the number of transceivers (6). According to a possible embodiment, the antennas (5) are connected by cables to the transceivers (6). Preferably, the locating station (4) comprises at least four antennas (5).

Figure 4:
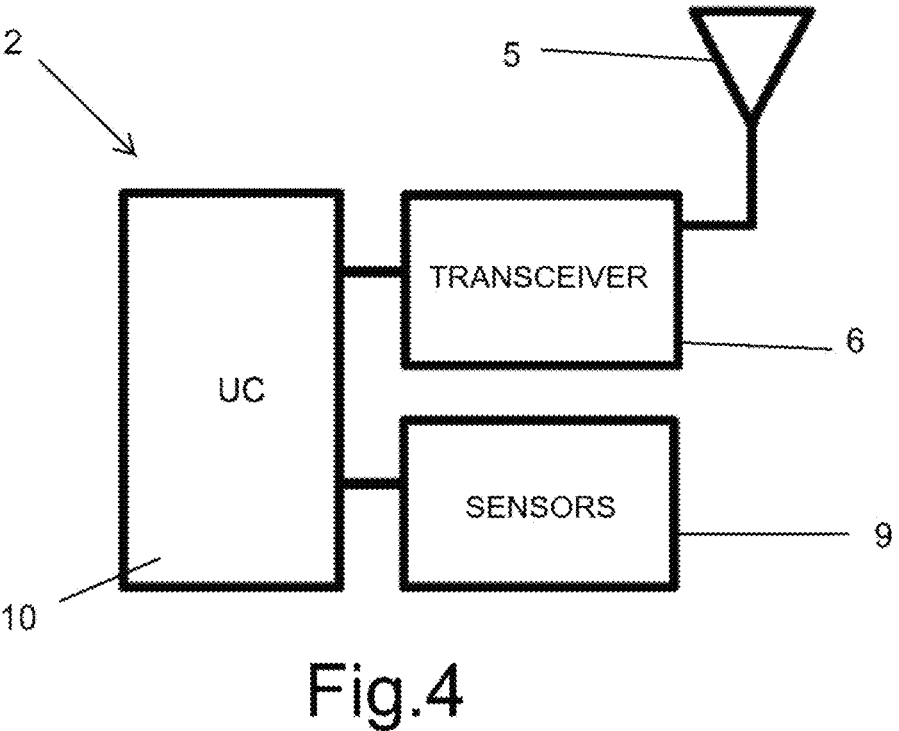
FIG. 4 shows a schematic view of an exemplary embodiment of the tag of the real-time locating system object of the present invention.

FIG. 4 shows a diagram of an embodiment of the tag (2) of the real-time locating system object of the present invention.

The tag (2) comprises an antenna (5), a transceiver (6), a control unit (10) and a plurality of sensors (9) (the sensors (9) may include accelerometers, gyroscopes, magnetometers, pressure sensors, temperature sensors, etc.).

FIG. 2 shows a locating station (4) with the same number of transceivers (6) as antennas (5), specifically showing a locating station (4) with six transceivers (6) and six antennas (5).

The locating station (4) also comprises a processing and control unit (7), a synchronisation unit (8) and a plurality of sensors (9) (the sensors (9) may include accelerometers, gyroscopes, magnetometers, pressure sensors, temperature sensors, etc.).

Figure 3:
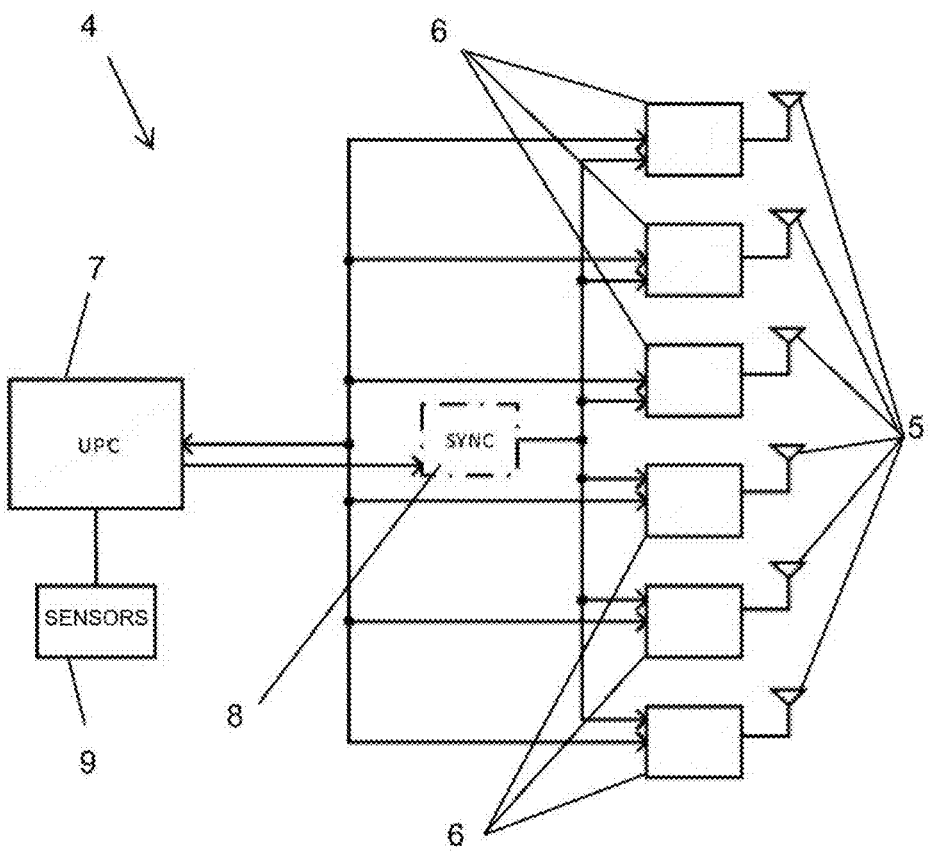
FIG. 3 shows a block diagram of an embodiment of the locating station of the real-time locating system object of the present invention.

FIG. 3 schematically represents, as a block diagram, a possible embodiment of the locating station (4).

Figure 5:
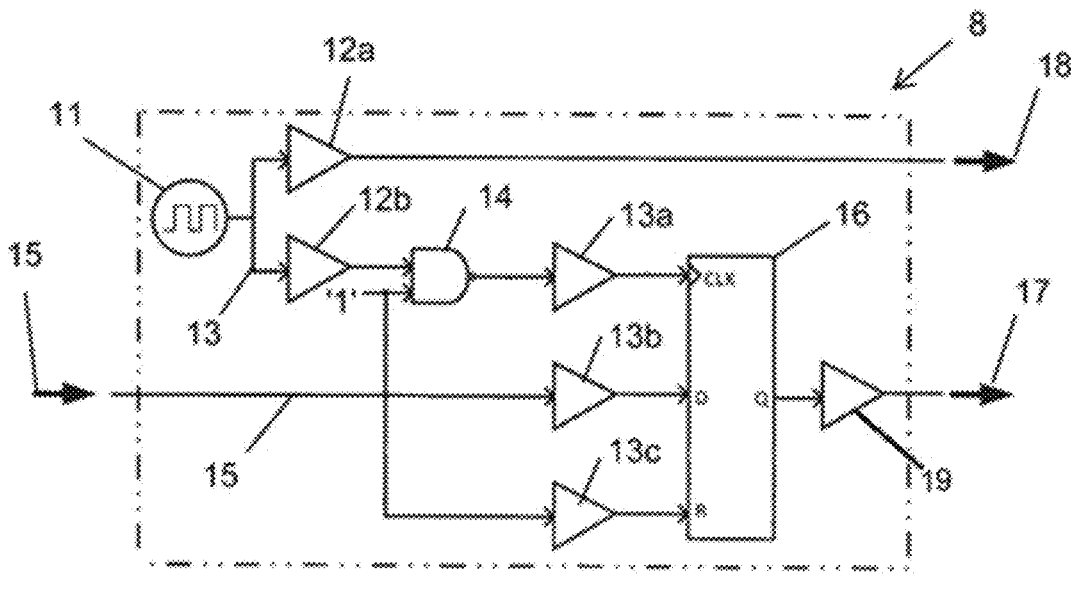
FIG. 5 shows a schematic view of an embodiment of the locating station synchronisation unit of the real-time locating system object of the present invention.

FIG. 5 shows a possible embodiment of the synchronisation unit (8). This synchronisation unit (8) consists of a clock (11), several first buffers (12a), (12b), second buffers (13a), (13b), (13c), a NAND gate (14), a D-type flip-flop (16) and a third buffer (19). The synchronisation unit (8) has as an input a first digital signal (15) that is generated by the processing and control unit (7) every time that the transceivers (6) are to be re-synchronised. One of the outputs of the synchronisation unit (8) is a second digital signal (17) that will serve to synchronise the transceivers (6). A third digital signal (18) as an output will be the clock used in the transceivers (6).

The real-time locating system object of the present invention is configured so that each of the tags (2) is the one that emits (on its own initiative and not in response to a previous signal received by the transceivers (6) of the locating station (4)) a presence signal with its own identifier.

Each tag (2) emits a presence signal (signalling beacon) with broad dissemination and associated with its own identifier, so that it can be received by any locating station (4)

that may be nearby. The signal emitted by each tag (2) has a predetermined sending frequency.

To estimate the position of the tags (2), the transceivers (6) of the locating station (4) are configured to be in receiving or listening mode by default and on the same wireless channel (which can be UWB or other type of signal) as the tags (2).

The presence signal emitted by each tag (2) is received by two or more transceivers (6) of the locating station (4) at different moments of time.

The synchronisation unit (8) is configured to send a synchronised clock signal to all the transceivers (6). When a transceiver (6) receives, through an antenna (5), a presence signal from a tag (2), the transceiver (6) sends to the processing and control unit (7) the identifier of the tag (2), the reception time of the presence signal marked by the clock signal and/or other types of information associated with the tag (2).

Thus, through the identifier associated with the presence signal sent by the tag (2) and received by the transceivers (6), and through the time signal that marks the moment that the presence signal sent by the tag (2) is received in each transceiver (6), the processing and control unit (7) calculates the location of the corresponding tag (2) (and therefore the location of the object that carries said tag (2)), taking as a reference the reception time of the presence signal in a given transceiver (6) and through the corresponding positioning algorithm (TDoA or ToA).

As already mentioned, the presence signal sent by each tag (2) can be received by two or more transceivers (6). In principle, it is enough for the presence signal sent by the tag (2) to be received by four antennas (5) so that the processing and control unit (7) can calculate the position of said tag (2). In the event that the presence signal sent by the tag (2) is received by less than four antennas (5), the position of the tag (2) can be calculated by combining the time of arrival information with the information from the sensors (9) that carry the tag (2) and the sensors (9) of the locating station (4).

The sensors (9) present in the locating station (4) allow the processing and control unit (7) to be aware of the relative position of some transceivers (6) with respect to others.

Due to the described real-time locating system, it is not necessary to have a set of fixed beacons (anchors (1)) installed throughout an enclosure, and therefore it is not necessary to calibrate said system prior to starting up operation in a certain enclosure or place in order to detect a set of mobile tags (2).

With the previously described real-time locating system, it is enough to place the locating station (4) in a certain location (for example, on a runway or drone landing platform) and place the mobile tags (2) on the elements to be located in real time. If the locating station (4) is placed on a vehicle or mobile robot, the relative position of the mobile tags (2) with respect to the vehicle or mobile robot can be estimated.

Likewise, by means of the described real-time locating system, the mobile tags (2) are the ones that send a presence signal (associated with a specific identifier of the mobile tag (2)) to the transceivers (6) of the locating station (4). Therefore, it is not necessary to establish two-way communication through a wireless channel (UWB or another type of signal), but rather, with a single signal sent from the tag (2) to the transceivers (6), the locating station (4) can locate said tag (2). This allows the radio frequency channel to almost always be free and reduces latency in signal transmission, while reducing possible errors or inaccuracies in the location of the tags (2).

However, the real-time locating system object of the present invention also allows that, if a signal is to be transmitted to each of the tags (2) (for example, an alarm signal or warning of danger to some robots or drones so that they do not enter a certain space), the transceivers (6) of the locating station (4) can send said signal to the corresponding tags (2).

Likewise, the real-time locating system also allows, if desired or if of interest for the specific application, to dispose a set of tags (2) at fixed points along an infrastructure, so that said tags (2) emit guiding signals to automated guided vehicles (AGVs).

The invention claimed is:

1. A real-time locating system comprising at least one radio frequency tag (2) disposed in a mobile element to be located in real time, and at least one locating station (4),
    wherein the at least one locating station (4) comprises:
        a processing and control unit (7);
        a plurality of transceivers (6) connected to the processing and control unit (7) and configured to remain in a listening or receiving state by default;
        a plurality of antennas (5) connected to the transceivers (6);
        means for determining a relative position of the antennas (5) with respect to one another, and/or between the transceivers (6) and;
        a synchronisation unit (8) configured to send one same clock signal to all the transceivers (6) of the at least one locating station (4);
    wherein the at least one tag (2) comprises:
        a transceiver (6);
        an antenna (5) connected to the transceiver (6), and;
        a control unit (10);
    wherein the at least one tag (2) is configured to periodically emit a presence signal associated with an identifier of said at least one tag (2);
    wherein the at least one locating station (4) is configured so that, through at least one first antenna (5) associated with a first transceiver (6) and through at least one second antenna (5) associated with the first transceiver (6) or with a second transceiver (6), the first transceiver (6) and, optionally, also the second transceiver (6) receive said presence signal associated with the identifier of the at least one tag (2) and send to the processing and control unit (7) the identifier of the tag (2), as well as a reception time, marked by the clock signal, of the presence signal in the at least one first antenna (5) and in the at least one second antenna (5);
    wherein the processing and control unit (7) is configured to calculate the position of the at least one tag (2) based on the difference in the reception time of the presence signal of the at least one tag (2) between the at least one first antenna (5) and the at least one second antenna (5);
    wherein:
        the locating station (4) and/or the at least one tag (2) comprises a plurality of sensors (9) configured to calculate the position of the at least one tag (2); and
        the means for determining a relative position of the antennas (5) of the locating station (4) with respect to one another comprises the sensors (9) of the locating station (4) and/or the sensors (9) of the at least one tag (2).

2. The real-time locating system according to claim 1, wherein the at least one tag (2) comprises a plurality of sensors (9) configured to calculate the position of the at least one tag (2).

3. The real-time locating system according to claim 1, wherein the set of sensors (9) of the locating station (4) and/or of sensors (9) of the at least one tag (2) comprises a selection of one or more of the following elements: an accelerometer, a gyroscope, a pressure sensor, a magnetometer and a temperature sensor.

4. The real-time locating system according to claim 1, wherein the locating station (4) comprises at least four antennas (5).

5. The real-time locating system according to claim 1, wherein the locating station (4) comprises at least four transceivers (6).

6. The real-time locating system according to claim 1, wherein the synchronisation unit (8) comprises a clock (11), first buffers (12a, 12b), second buffers (13a), (13b), (13c), a NAND gate (14), a D-type flip-flop (16) and a third buffer (19), wherein the synchronisation unit (8) has as an input a first digital signal (15) that is generated by the processing and control unit (7) to synchronise the transceivers (6), wherein the synchronisation unit (8) is configured to generate as output signals a second digital signal (17) configured to synchronise the transceivers (6) and a third digital signal (18) as a clock signal.

7. The real-time locating system according to claim 1, wherein the processing and control unit (7) is configured to establish the moment that the presence signal of a tag (2) reaches a certain transceiver (6) as a time source reference and, based on said time source, determine the difference in the time of arrival of the presence signal of said tag (2) to each additional transceiver (6) that receives the presence signal of said tag (2).

8. The real-time locating system according to claim 1, wherein the means for determining a relative position of the antennas (5) of the locating station (4) with respect to one another further comprise a configuration of the transceivers (6), which are configured to communicate wirelessly with one another, and wherein the processing and control unit (7) is configured to estimate the relative position of some antennas (5) with respect to others based on the moment that the signal sent by at least one transceiver (6) reaches at least another transceiver (6).

9. The real-time locating system according to claim 1, wherein the means for determining a relative position of the antennas (5) of the locating station (4) with respect to one another further comprise a configuration of the transceivers (6), which are configured to communicate wirelessly with one another and with a set of sensors (9), and wherein the processing and control unit (7) is configured to estimate the relative position of some antennas (5) with respect to others based on the moment that the signal sent by at least one transceiver (6) reaches at least another transceiver (6) and based on the values from the sensors (9) of the locating station (4).

10. The real-time locating system according to claim 1, wherein the means for determining a relative position of the antennas (5) of the locating station (4) with respect to one another further comprise a configuration of the transceivers (6), which are configured to communicate wirelessly with one another and with at least one tag (2), and a set of sensors (9) in the locating station and in at least one tag (2), and wherein the processing and control unit (7) is configured to estimate the relative position of some antennas (5) with respect to others based on the moment that the signal sent by at least one transceiver (6) reaches at least another transceiver (6), based on the moment that the signal sent by at least one tag (2) reaches at least one transceiver (6) and based on the values from the sensors (9) of the locating station (4) and/or of at least one tag (2).

11. The real-time locating system according to claim 1, wherein the locating station (4) is configured to send, through one or more transceivers (6), a signal to the at least one tag (2), for guiding or restricting the movement of the mobile element that carries said at least one tag (2).

12. The real-time locating system according to claim 1, wherein the locating station (4) is configured to use the position information of the at least one tag (2), for guiding or restricting the movement of a mobile element that carries said locating station (4).

13. The real-time locating system according to claim 1, wherein the locating station (4) is configured to use measurements from the sensors (9) of the at least one tag (2) and/or measurements from the sensors (9) of the locating station (4), for guiding or restricting the movement of a mobile element that carries said locating station (4).

\* \* \* \* \*